US008244521B2

(12) United States Patent
Dolan

(10) Patent No.: US 8,244,521 B2
(45) Date of Patent: Aug. 14, 2012

(54) PARAPHRASING THE WEB BY SEARCH-BASED DATA COLLECTION

(75) Inventor: William Dolan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/724,703

(22) Filed: Mar. 16, 2007

(65) Prior Publication Data

US 2008/0172378 A1 Jul. 17, 2008

Related U.S. Application Data

(60) Provisional application No. 60/879,999, filed on Jan. 11, 2007.

(51) Int. Cl.
*G06F 17/27* (2006.01)
(52) U.S. Cl. ............... 704/9; 704/1; 704/10; 707/706; 707/707; 707/708; 707/718
(58) Field of Classification Search .................. 704/1, 9, 704/10; 707/706–708, 718
See application file for complete search history.

(56) References Cited

U.S. PATENT DOCUMENTS

| | | | |
|---|---|---|---|
| 6,098,033 A | 8/2000 | Richardson et al. ............. 704/1 |
| 6,138,085 A | 10/2000 | Richardson et al. ............. 704/1 |
| 6,173,261 B1 | 1/2001 | Arai et al. ..................... 704/257 |
| 6,260,008 B1 | 7/2001 | Sanfilippo ........................ 704/9 |
| 6,810,376 B1 | 10/2004 | Guan et al. ....................... 704/9 |
| 6,823,333 B2 * | 11/2004 | McGreevy ........................... 1/1 |
| 6,859,800 B1 * | 2/2005 | Roche et al. .................. 707/718 |
| 7,003,513 B2 * | 2/2006 | Geiselhart ............................ 1/1 |
| 2001/0014902 A1 | 8/2001 | Hu et al. ........................ 707/540 |
| 2002/0188587 A1 * | 12/2002 | McGreevy ........................ 707/1 |
| 2002/0188599 A1 * | 12/2002 | McGreevy ........................ 707/3 |
| 2003/0004914 A1 * | 1/2003 | McGreevy ........................ 707/1 |
| 2004/0122656 A1 * | 6/2004 | Abir ................................. 704/4 |
| 2004/0181759 A1 | 9/2004 | Murakami et al. ............. 715/532 |
| 2005/0065947 A1 | 3/2005 | He et al. ........................ 707/100 |

FOREIGN PATENT DOCUMENTS

| | | |
|---|---|---|
| GB | EP 0649106 B1 | 4/1995 |
| GB | EP 0271664 A3 | 6/1998 |

OTHER PUBLICATIONS

Banerjee et al. Extended Gloss Overlaps as a Measure of Semantic Relatedness, 2003, International Joint Conference on Artificial Inteligence vol. 18, pp. 805-810.*
Landauer, T.; "A Solution to Plato's Problem: The Latent Semantic Analysis Theory of Acquisition, Induction and Representation of Knowledge," lsi.argreenhouse.com/lsi/papers/PSYCHREV96.html, Dec. 2006, 85 pgs.
Turney, P.; "Mining the Web for Synonyms: PMI-IR versus LSA on TOEFL," Sep. 2001, Lecture Notes in Computer Science, pp. 1-12.

* cited by examiner

*Primary Examiner* — David R Hudspeth
*Assistant Examiner* — Lamont Spooner
(74) *Attorney, Agent, or Firm* — Westman, Champlin & Kelly, P.A.

(57) ABSTRACT

String-oriented web queries are utilized as a tool to examine the fabric of how words, phrases and/or n-grams alternate in a language. This fabric is exploited in order to build up a matrix of semantically equivalent pieces of language. In one embodiment, the Distributional Hypothesis is utilized, along with strategies for confirming synonymy, to systematically build up a picture of what words/phrases can be legitimately substituted for one another.

20 Claims, 3 Drawing Sheets

PARAPHRASING THE WEB BY SEARCH-BASED DATA COLLECTION

The present application is based on and claims the benefit of U.S. provisional patent application Ser. No. 60/879,999, filed Jan. 11, 2007, the contents of which is hereby incorporated by reference in its entirety.

BACKGROUND

In many cases, the meaning of a word or phrase is defined by, or is at least evident in, surrounding words or phrases. Thus, for a given word or phrase, a word or phrase that occurs in a similar context will tend to have the same or similar meaning. These types of pairs of words or phrases that have the same or similar meaning can be useful for a wide variety of language processing applications such as, but certainly not limited to, paraphrase generation and language translation.

The world-wide-web (a.k.a., "the web") consists of an explicitly interlinked network of documents. But implicit in the web is a more subtle kind of informational network, namely an implicitly linked network of overlapping pieces of linguistic expression. Many pages, for instance, contain the string "walked down by the river", however few if any of these pages are linked to one another, and nothing explicitly reflects the fact that all these pages share an identical chunk of linguistic content. There is a broad range of language processing applications that could benefit from systems or methods for effectively analyzing these types of overlapping pieces of linguistic expression so as to identify pairs of words or phrases that have the same or similar meaning.

The discussion above is merely provided for general background information and is not intended for use as an aid in determining the scope of the claimed subject matter.

SUMMARY

String-oriented web queries are utilized as a tool to examine the fabric of how words, phrases and/or n-grams alternate in a language. This fabric is exploited in order to build up a matrix of semantically equivalent pieces of language. In one embodiment, the Distributional Hypothesis is utilized, along with strategies for confirming synonymy, to systematically build up a picture of what words/phrases can be legitimately substituted for one another.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
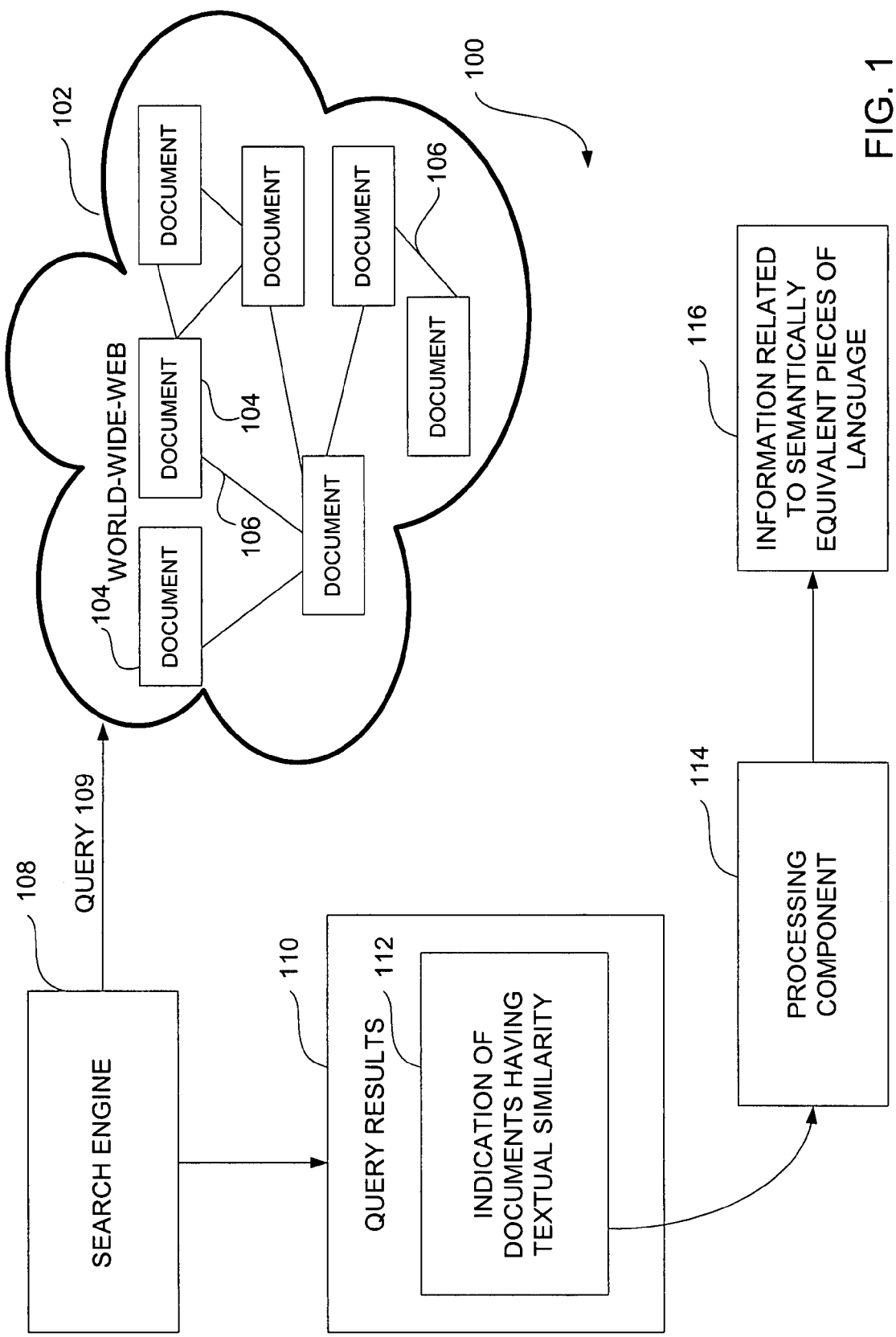
FIG. 1 is a schematic diagram of a system for generating a collection of information related to semantically equivalent piece of language.

FIG. 1 is a schematic diagram of a system 100 for generating a collection 116 of information related to semantically equivalent pieces of language. System 100 includes a very simplified representation 102 of the world-wide-web (a.k.a., "the web"). Web 102 consists of a vast collection of documents 104, of which only a representative few are shown and identified in FIG. 1. It should be noted that the term "document" is intended to loosely mean a collection of individually identifiable web content, which could include, but certainly isn't limited to, a web page, a text document, a multimedia file, or any other collection of data. A plurality of interconnections in the form of links 106 serve to form a network of documents 106, as is well known in the art. Only a representative few of links 106 are shown and identified in FIG. 1.

A search engine 108 is configured to execute a query 109 against the content of web 102. A collection of results 110 is produced based on the query. Results 110 include an indication 112 of documents 104 having a textual characteristic that is, in some way, similar to a textual characteristic of the corresponding originating query 109.

Thus, implicit in web 102 is a relatively subtle kind of informational network, namely an implicitly linked network of overlapping pieces of linguistic expression. Many documents 104 might contain the same textual characteristics; however, few if any of these documents might be linked to one another by an explicit link 106, or the distance between these documents in terms of the number of links that must be traversed might be very large. Generally speaking, there is no effective reflection of the fact that all these documents share an identical chunk of linguistic content.

Processing component 114 is configured to analyze indications 112 and/or the corresponding document so as to produce information 116. Information 116 is indicative of semantically equivalent pieces of language as reflected in indications 112 and/or the corresponding documents. It should be noted that it may be an oversimplification to show information 116 derived based on the results of a single query 109. In actuality, in one embodiment, the results of multiple queries 109, factored independently or in combination into algorithms applied by component 114, may be utilized as the basis for the generation of information 116.

In one embodiment, processing component 114 is configured to facilitate the utilization of search engine 108 to query web 102 in order to look for, on a fragment-by-fragment basis, words and phrases that would seem to occur in contexts similar to those associated with a target sentence or phrase. A confirmation process is illustratively conducted in order to confirm that the similar words and phrases mean the same thing as their equivalent in the target sentence or phrase. In one embodiment, the confirmation process involves either or both of direct queries and looking for mutual reinforcement of "neologrograms" as the semantic space around the target sentence or phrase is explored through repeated web queries. As more and more sentences or phrases are subjected to the search procedure, a set of available mappings for any given input materializes and expands. Thus, in one embodiment, the Distributional Hypothesis ("The Distributional Hypothesis" is a technical term that is well known in the field of natural language processing) is utilized, along with heuristic/probabilistic strategies for confirming synonymy, to systematically build up a picture of what words/phrases can be logically substituted for one another. In one embodiment, a large number of heuristic query results are used as features in a statistical classifier making the confirm/deny decision.

Figure 2:
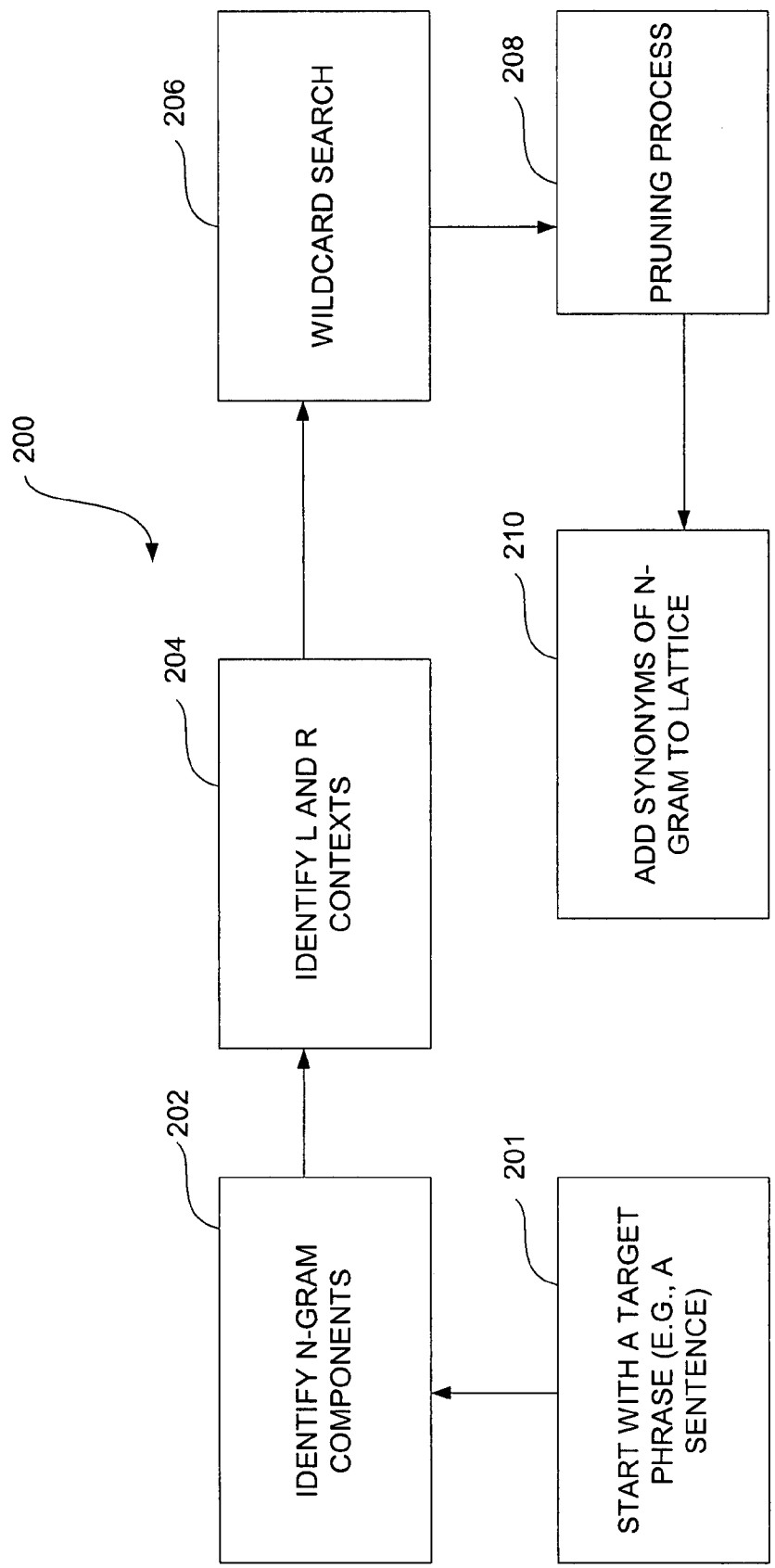
FIG. 2 is a flow chart diagram demonstrating a process for generating or identifying a collection of words or phrases that are semantically similar to each other.

FIG. 2 is a flow chart diagram demonstrating a process 200 to be applied in order to generate or identify a collection of words or phrases that are semantically similar to each other. In accordance with block 201, the process begins by obtaining a starting target phrase that may or may not be a complete sentence. In accordance with block 202, n-grams that correspond to the target phrase are identified. For example, the sentence "I walked down the street to the store.", corresponds to n-grams such as the following:

> "I walked down the street to the store.",
> "I walked down the street to the",
> "I walked down the street to",
> "I walked down the street",
> "I walked down the",
> "I walked down",
> "I walked",
> "walked down the street to the store",
> "down the street to the store",
> "the street to the store",
> "street to the store",
> "to the store", and
> "the store."
> etc.

In accordance with block 204, for each n-gram, left (L) and right (R) contexts are identified. The L context is illustratively a word or a series of words to the left of the n-gram, and the R context is illustratively a word or series of words to the right of the n-gram. In one embodiment, not by limitation, the contexts are identified through consultation with a web index. Examples of potential L and/or R contexts for the n-gram "walked down" are:

> [After dinner we] walked down [by the river]
> [Then John and I] walked down [to the restaurant]
> [They had] walked down [Waring Road]
> [Mrs. Smith never] walked down [by the river]

In accordance with block 206, for each of the L and R contexts, a search of the web index is performed using the L and R contexts, and replacing the original n-gram with a wildcard. This returns n-grams that are distributionally similar to the original n-gram. For example, a wildcard search of "After dinner we * by the river", illustratively might return:

> [After dinner we] strolled [by the river]
> [After dinner we] had a big argument [by the river]
> [After dinner we] had dessert [by the river]
> [After dinner we] watched ducks [by the river]
> [After dinner we] took a walk [by the river]

Some of these wildcard replacements (e.g., strolled, took a walk) might be similar in meaning to the n-gram they replaced. These are desirable search results. Others (e.g. had a big argument, had dessert) will be distributionally but not semantically similar. These are search results that it would be okay to eliminate.

In accordance with block 208, a pruning process is carried out. The pruning process illustratively involves a determination as to whether or not each wildcard n-gram returned following step 206 is semantically similar to the original corresponding n-gram. There are a variety of different ways to accomplish this, and the present invention is not limited to any one particular way or combination of ways. Further, those skilled in the art will appreciate that the scope of the present invention is also not limited to the specific way or ways described herein. Some examples will now be provided.

One method to determine whether a wildcard n-gram is semantically similar to the n-gram it replaced is to perform an L and R context search (e.g., search the web or any other body of content). If the n-grams have matching L and R context results, this suggests that the n-grams are more likely to be semantically similar than if they have no matching L and R context results. For example, an L and R context search for the n-grams, "strolled", "had a big argument", "had dessert", "watched ducks", and "took a walk", might return the following results:

> [The revelers] strolled [down the street]
> [they had always] strolled [across the lawn]
> [first time we'd] had a big argument [about spiders]
> [the council members] had a big argument [but decided against]
> [the red foxes] watched ducks [all the time and]
> [the little kids] watched ducks [while the rest of us]
> [to my surprise, he] took a walk [over to my sister's]
> [eventually we] took a walk [down the street]

These example results show that the n-grams "strolled" and "took a walk" both have an R context that matches an R context of the original n-gram (i.e., "walked down"). This suggests that the n-grams "strolled", "took a walk", and "walked down" may be semantically similar. The results also show that the n-grams "had a big argument" and "watched ducks" had no matching L or R contexts. This suggests a presumption against semantic similarity.

In one embodiment, a presumption of semantic similarity is based on a comparison of the R and L wildcard contexts to something other than the contexts of the original corresponding n-gram. For example, a presumption might be based on a comparison to other R and L contexts produced in the step 206 wildcard searching, or contexts produced in another of the previous steps. Or, the presumption might be based on a comparison of the contexts of multiple different wildcards (i.e., a context that comes up the same for x number of the wildcard n-grams might be a valid basis for inferring semantic similarity). Any basis for comparing wildcard n-gram contexts to determine semantic similarity should be considered within the scope of the present invention.

In one embodiment, the pruning determination is made through a more explicit determination as to whether a synonym relationship exists. There are many different heuristic or probabilistic clustering strategies that can be applied to support such a determination, and, in one embodiment, such a determination is made by searching the web or any other body of content for a specific string that might confirm a hypothesized semantic relationship. In one embodiment, the determination is made based on presence or absence of a coordination pattern (e.g., searching for strings—including morphological alterations of the original terms—such as "strolling and walking", "strolled and walked", "strolls or walks", "walks or strolls", etc.). In another embodiment, the determination is made based on presence or absence of a negative coordination pattern (e.g., negative evidence in the form of strings like "strolling but not walking", "a walk but not a stroll", etc.). In one embodiment, the determination is made based on presence or absence of strings signaling an explicit synonymy relationship (e.g., "strolling is walking", "a walk is a stroll", "walking and strolling are both", "walks and strolls are both", etc.). In one embodiment, the determination is made based on presence or absence of co-occurrence (e.g., "down the street", "over the road"). These are only examples of possible heuristics. Those skilled in the art will appreciate that these and many other alternatives are within the scope of the present invention.

Queries (e.g., against the web or another body of content) that incorporate a one more association heuristics, such as but not limited to those described in the previous paragraph, can be utilized as a basis for evaluating and/or determining semantic association. In one embodiment, a set of templatic queries that reflect association heuristics are provided. Slots in the templates are filled with words/phrases from context sets. The fleshed-out templates are launched as quoted-string queries. A record and/or count of the presence/absence of hits is maintained. The goal is to confirm or deny semantic relationships. The results illustratively take on significance in aggregate as multiple queries are generated and launched based on multiple templates (e.g., a single result may be untrustworthy but may be trustworthy when aggregated with other results). Many if not most queries will have a null result.

It is also within the scope of the present invention to apply multiple tests to determine whether certain alternatives should be maintained as being presumptively semantically similar or discarded. In one embodiment, an alternative can be presumed semantically similar if one test is passed but not another (e.g., none of a plurality of explicit heuristics apply so as to confirm semantic similarity but a wildcard n-gram context test does confirm semantic similarity). All combinations of tests, should be considered within the scope of the present invention.

In accordance with block 210, n-grams returned from block 206 that have been determined to be semantically similar to the original corresponding n-gram are added to a lattice of words or phrases demonstrating synonym or paraphrase worthy characteristics. In one embodiment, at least some of the identified semantically similar n-grams are used as a basis for another search iteration to pull back other contexts. For example,

[?] strolled down the street
[?] walked down the street

Moving across a sentence in this way will gradually build up a lattice of replacement n-gram candidates, for example:

| I | walked down the street | to the store. |
|---|---|---|
|   | strolled |   |
|   | took a walk |   |
|   |   | by the shops |
|   |   | in the department store |

In one embodiment, a matrix is constructed of possible paths through the semantic space of the original phrase or sentence. Further, in one embodiment, taking the union of all possible paths through the lattice supports a check on each replacement possibility, every possible n-gram from the union being used as a query. Success on any query that bridges a boundary between multiple neolograms can be taken as reinforcing previous hypotheses (e.g., strolled down, took a walk down by the river, etc.). In embodiment, n-gram frequency is factored in (e.g., frequency of appearances on the web), for example, for weighting purposes.

It is to be understood that the examples provided herein are given only for illustration and are not to be interpreted as limiting. Those skilled in the art will appreciate that broad potential for uses, applications and variations. It should also be noted that the described process presents opportunities for generating data sets in a variety of different formats suitable for a variety of different analytical or processing purposes. In one embodiment, context grouping is performed. For example, clustering can be done based on R or L context. Following is an example of R context clustering:

| The group | << | also meets 15 (web count) |
|---|---|---|
| youth group | << | also meets 2 |
| web site | << | also meets 3 |
| This course | << | also meets 10 |
| The class | << | also meets 3 |
| The club | << | also meets 4 |
| s Ministry | << | also meets 2 |
| The Council | << | also meets 5 |
| This group | << | also meets 12 |
| The program | << | also meets 4 |
| stylish design | << | also meets 2 |
| A group | << | also meets 3 |
| This sand | << | also meets 2 |
| this site | << | also meets 15 |
| The system | << | also meets 3 |
| This class | << | also meets 8 |
| The Board | << | also meets 5 |
| This program | << | also meets 5 |
| Post 31 | << | also meets 2 |
| Youth Group | << | also meets 5 |
| practice and | << | also meets 2 |
| exec. committee | << | also meets 2 |
| needs and | << | also meets 3 |

In this example, it is evident that many types of groups occur in the L context. Presumably, a similar list could be generated in the L context for addition n-grams such as "also hosts meetings" or "gets together on". It may be desirable to link these additional n-grams to "also meets." This type of reciprocal matching of clustered contexts reinforces an evolving system of interconnectedness and represents but one example of how a data set generated in accordance with an embodiment of the present invention can be utilized for a unique analytical purpose.

In one example of a variation, the described processes can be utilized to gather bilingual data. In one embodiment, in this variation, searches are seeded with aligned phrase pairs. This variation is possible because the mapping between a pair of languages (at least those that are well represented on the web) is implicit in overlapping phrases/contexts. Information can be gleaned from this network of overlaps by processing a bilingual web index, and looking for pairings that seem, based on shared contexts, to mean the same thing.

It is within the scope of the present invention to utilize the techniques described herein to build a data-driven parser. Instead of an algorithm that attempts to identify syntactic constituents, syntactic analysis becomes a matter of looking up the different n-grams in a sentence and building a lattice of possible constituents that span the input string. In one embodiment, each possible constituent has an associated heuristic probability based on features such as, but not limited to, counts from the index (identified during the exploration phase), the number of different times that sub-string was found to be a coherent collection in different contexts, etc.

In one embodiment, analytical and processing tools are configured to account for syntactic boundaries that emerge from the exploration strategy described herein, though they are of course unlabeled and "naively" identified. The strategy has no knowledge of English syntax; structure is instead an emergent property of the data. For instance, the following set incorporates "that may result" as the seed:

| | | | |
|---|---|---|---|
| that may result | >> | in a claim | 2 |
| that may result | >> | from the use | 31 |
| that may result | >> | in unnecessary delays | 2 |
| that may result | >> | in harm to | 2 |
| that may result | >> | from the chronic | 2 |
| that may result | >> | from your use | 10 |
| that may result | >> | in a change | 2 |
| that may result | >> | in unintended pregnancy | 3 |
| that may result | >> | in mental and | 2 |
| that may result | >> | from surgery may | 2 |
| that may result | >> | from use of | 13 |
| that may result | >> | in adverse outcomes | 2 |
| that may result | >> | in such events | 3 |
| that may result | >> | in disclosure of | 49 |
| that may result | >> | in the administering | 2 |
| that may result | >> | from such use | 3 |
| that may result | >> | in additional charges | 2 |
| that may result | >> | in wrong diagnosis | 2 |
| that may result | >> | from your participation | 4 |
| that may result | >> | FROM THE USE | 25 |
| that may result | >> | in this status | 2 |
| that may result | >> | FROM YOUR USE | 4 |
| that may result | >> | from the information | 2 |
| that may result | >> | in SPE terminating | 2 |
| that may result | >> | in termination of | 8 |
| that may result | >> | FROM TRAVEL TO | 4 |
| that may result | >> | in the restriction | 5 |
| that may result | >> | from your access | 6 |
| that may result | >> | if you fail | 13 |
| that may result | >> | from your failure | 3 |
| that may result | >> | from exposure to | 3 |
| that may result | >> | in an unwarranted | 2 |
| that may result | >> | from links appearing | 2 |
| that may result | >> | from the usage | 2 |
| that may result | >> | in your order | 2 |
| that may result | >> | from such misrepresentations | 2 |
| that may result | >> | in use of | 2 |
| that may result | >> | FROM USE OF | 5 |
| that may result | >> | from our refusal | 4 |
| that may result | >> | from providing the | 4 |
| that may result | >> | from any errors | 3 |
| that may result | >> | in any way | 2 |
| that may result | >> | in disciplinary action | 2 |
| that may result | >> | from using the | 3 |
| that may result | >> | from your reliance | 2 |
| that may result | >> | directly or indirectly | 5 |
| that may result | >> | from information contained | 3 |
| that may result | >> | in severe dehydration | 2 |
| that may result | >> | from these factors | 3 |
| that may result | >> | from the hacking | 7 |
| that may result | >> | as a consequence | 2 |
| that may result | >> | from the misuse | 4 |
| that may result | >> | in adverse effects | 2 |
| that may result | >> | from furnishing such | 3 |
| that may result | >> | from its use | 2 |
| that may result | >> | from providing information | 2 |
| that may result | >> | from skill deficiency | 2 |
| that may result | >> | from improper operation | 2 |
| that may result | >> | from visa delays | 2 |
| that may result | >> | in years of | 2 |
| that may result | >> | in a conflict | 2 |

The contexts immediately to the right exhibit a clean pattern. In almost every case, the next word is either "in" or "from", reflecting the tight collocations "may result from" or "may result in." The only violation of this rule is "directly," reflecting the syntactic freedom that English adverbs enjoy. If one were to go and look at the original snippets for each of these hits, they would likely find that after "that may result in/from" there is a following noun phrase. Of course, that does not indicate that the left edge is correct; confirmation of this will have to wait until the exploration strategy looks at other fragments. It might turn out, for example, that the relevant fixed n-gram constituent is longer than this window, say "one phenomenon that may result from/in."

In a more complex example, the following context contains durations, though they are not expressed in string-identical ways. For example:

| | | | | |
|---|---|---|---|---|
| within the past | >> | week | 22 | |
| within the past | >> | month | 29 | |
| within the past | >> | few | 36 | |
| within the past | >> | year | 112 | |
| within the past | >> | two | 62 | |
| within the past | >> | day | 4 | |
| within the past | >> | three | 58 | |
| within the past | >> | six | 21 | |
| within the past | >> | seven | 17 | |
| within the past | >> | five | 51 | |
| within the past | >> | ten | 16 | |
| within the past | >> | decade | 9 | |
| within the past | >> | Three | 2 | |
| within the past | >> | 365 | 2 | |
| within the past | >> | Decade | 2 | |
| within the past | >> | fifteen | 2 | |
| within the past | >> | hour | 4 | |
| within the past | >> | fifty | 3 | |
| within the past | >> | generation | 3 | |
| within the past | >> | Year | 3 | |
| within the past | >> | century | 3 | |
| within the past | >> | twelve | 6 | |
| within the past | >> | couple | 2 | |
| within the past | >> | 100 | 2 | |
| within the past | >> | Month | 2 | |
| within the past | >> | twenty | 2 | |
| within the past | >> | Week | 2 | |
| within the past | >> | thirty | 2 | |
| within the past | >> | several | 7 | |
| within the past | >> | days | 3 | |
| within the past | >> | four | 3 | |
| within the past | >> | month I | 2 | |
| within the past | >> | week Within the | | 4 |
| within the past | >> | week within the | | 4 |
| within the past | >> | 10 years or | 2 | |
| within the past | >> | 2 days Within | 3 | |
| within the past | >> | day within the | | 3 |
| within the past | >> | one week one | 3 | |
| within the past | >> | 3 years and | 2 | |
| within the past | >> | three years or | | 4 |
| within the past | >> | 3 months within | | 9 |
| within the past | >> | 12 months which | | 2 |
| within the past | >> | 30 days are | 2 | |
| within the past | >> | ten years or | 2 | |
| within the past | >> | 14 days 7 | | 2 |
| within the past | >> | six years in | 2 | |
| within the past | >> | 12 months receive | | 2 |
| within the past | >> | three months in | | 3 |
| within the past | >> | month within the | | 3 |
| within the past | >> | five years is | 4 | |
| within the past | >> | two years of | 2 | |
| within the past | >> | month I have | 2 | |
| within the past | >> | couple of years | | 2 |
| within the past | >> | month in italics | | 2 |
| within the past | >> | 50 years was | 2 | |
| within the past | >> | 30 days and | 2 | |
| within the past | >> | two years in | 2 | |
| within the past | >> | 12 months or | 3 | |
| within the past | >> | two years by | 3 | |
| within the past | >> | five years for | | 2 |
| within the past | >> | 3 years been | 2 | |
| within the past | >> | year or so | | 2 |
| within the past | >> | two years or | 3 | |
| within the past | >> | 50 years could | | 2 |
| within the past | >> | year and need | 2 | |
| within the past | >> | few months and | | 2 |
| within the past | >> | month by simply | | 3 |
| within the past | >> | 12 months A | 2 | |

Secondary web queries should identify that these all have a common structure, though, and should support movement of the "real" syntactic boundary to the right, e.g.:

```
within the past 12 months >> receive
within the past three months >> in
within the past month >> was
within the past 2 days >> is
```

Eventually, after a large number of queries, and analysis of both left and right contexts, the process will start to hone in on the right constituent boundaries/their strengths. With simple, directed string searching, for example, it would be possible to identify that terms like "3" and "5" co-occur in strings on the web, as do "year" and "month" and "day." That will permit collapsing these terms onto each other, allowing a more abstract representation for these strings, such as:

```
within the past (1/2/3/4/5/6/...)
(day/days/week/weeks/fortnight/year/years/...)
```

This is but one example of how embodiments of the present invention can be applied to identify and apply syntactic structure.

Figure 3:
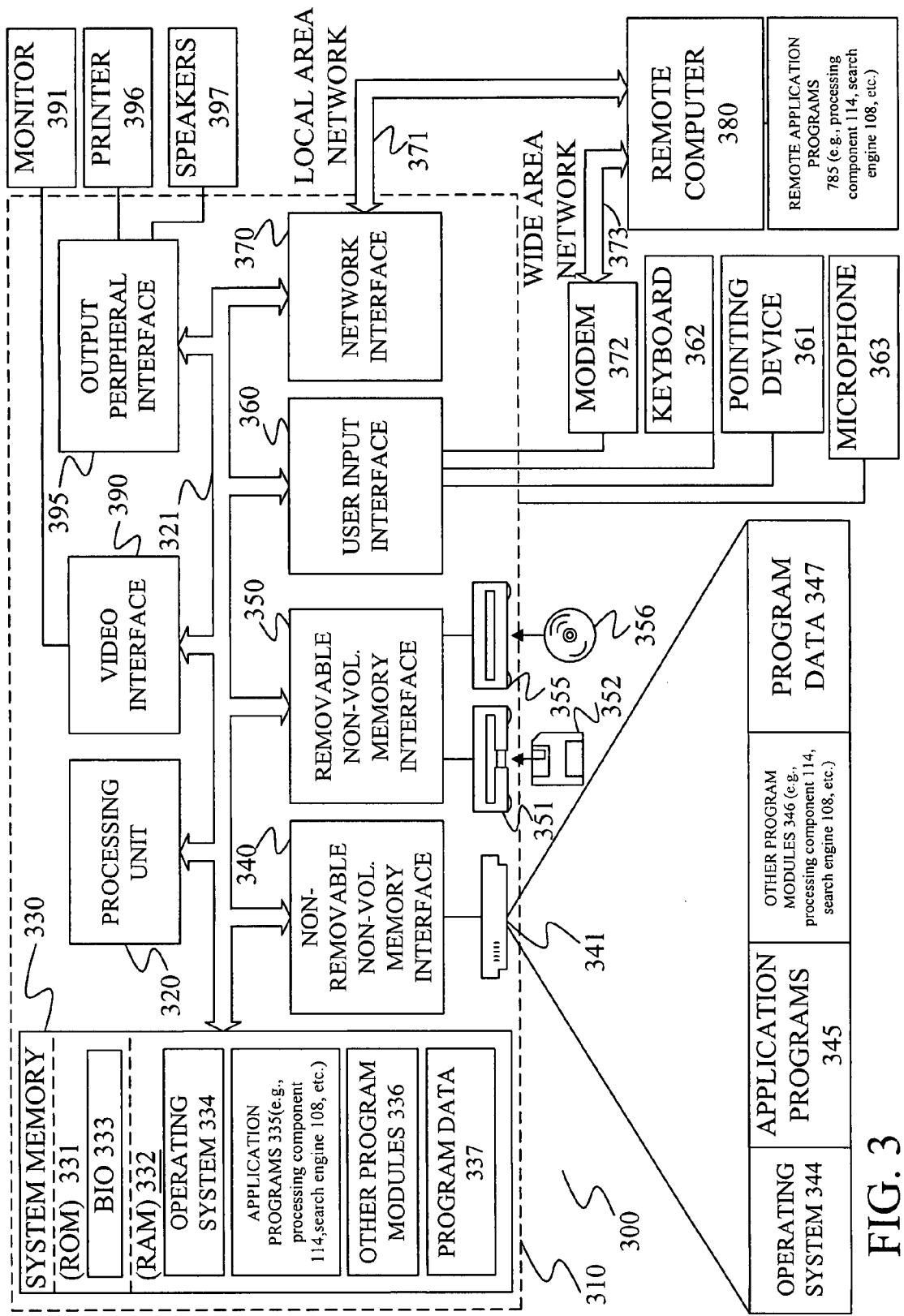
FIG. 3 illustrates an example of a computing system environment 300.

FIG. 3 illustrates an example of a suitable computing system environment 300 within which at least some embodiments of the present invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general-purpose computing device in the form of a computer 310. Components of computer 310 may include, but are not limited to, a central processing unit 320, a system memory 330, and a system bus 321 that couples various system components including the system memory to the processing unit 320.

The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. As is noted in FIG. 3, application programs 135 can include processing component 114 and/or search engine 108 and/or any other component utilized to support paraphrasing technology as described herein. This is but one of many potential examples of implementation within environment 300.

The computer 310 may also include other removable/non-removable volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. As is noted in FIG. 3, application programs 345 can include processing component 114 and/or search engine 108 and/or any other component utilized to support paraphrasing technology as described herein. This is but one of many potential examples of implementation within environment 300.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on remote computer 380. It will be appreciated that the network connections shown are exemplary and other means of establishing a communications link between the computers may be used. As is noted in FIG. 3, application programs 385 can include processing component 114 and/or search engine 108 and/or any other component utilized to support paraphrasing technology as described herein. This is but one of many potential examples of implementation within environment 300. The network of documents against which queries are performed may be stored locally within computing device 310, may be stored on a storage medium made accessible to 310, or may be stored remotely and made accessible to device 310 by way of a network connection such as those described in the context of environment 300.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for supporting a language processing application, the method comprising:

obtaining a starting target phrase of words that includes a first word, a last word, and a group of other words between the first and the last words;

identifying n-grams that correspond to the starting target phrase of words, each of the n-grams including a portion of the words in the starting target phrase, each n-gram being different from the other n-grams, at least some of the n-grams having different numbers of words, a first group of the n-grams including the first word and combinations of the other words, a second group of the n-grams including the last word and different combinations of the other words;

utilizing each of the n-grams to search a web index to identify other phrases of words that are different than the starting target phrase of words and that include the n-grams;

simultaneously identifying a plurality of left contexts and a plurality of right contexts for each of the n-grams by identifying words in the other phrases that precede and follow the n-grams in the other phrases, the plurality of left contexts including the words that precede the n-grams, and the plurality of right contexts including the words that follow the n-grams;

combining the plurality of left contexts and the plurality of right contexts for each of the n-grams with a wildcard to search for a list of phrases of words that are distributionally similar to the starting target phrase of words, the phrases of words including phrases having different numbers of words and including some phrases that are semantically similar to the starting target phrase and some phrases that are not semantically similar to the starting target phrase;

utilizing a computer processor that is a component of a computer to determine, based on results of multiple index queries, whether each phrase in the list of distributionally similar phrases of words is semantically equivalent to the starting target phrase of words, the multiple index queries including a query that explicitly identifies a presence or an absence of a synonymy relationship between the starting target phrase of words and the list of distributionally similar phrases of words in a string of text; and adding a portion of the list of phrases of words that are determined to be semantically equivalent to the starting target phrase of words to a lattice of replacement candidates for the starting target phrase of words.

2. The method of claim 1, wherein identifying the plurality of right contexts and the plurality of left contexts for each of the n-grams includes utilizing a search engine to execute a query against content of a world wide web, wherein the multiple index queries also include performing additional left and right context searches utilizing each of the phrases of words, and wherein phrases within the phrases of words are determined to be semantically similar to the starting target phrase of words based at least in part on the phrases having one or more left or right contexts in common with the starting target phrase of words.

3. The method of claim 1, wherein determining whether each phrase in the list of distributionally similar phrases of words is semantically equivalent to the starting target phrase of words comprises utilizing an index query engine to identify whether a string of text indicates that the starting target phrase of words and one of the distributionally similar phrases of words are equivalents.

4. The method of claim 1, wherein the web index includes web pages, text documents, and multimedia files.

5. The method of claim 1, wherein determining whether each phrase in the list of distributionally similar phrases of words is semantically equivalent to the starting target phrase of words includes utilizing a statistical classifier to make a confirm/deny decision.

6. The method of claim 5, wherein the statistical classifier utilizes heuristic query results as features.

7. The method of claim 1, wherein determining whether each phrase in the list of distributionally similar phrases of words is semantically equivalent to the starting target phrase of words includes identifying neologram reinforcements.

8. The method of claim 1, wherein determining whether each phrase in the list of distributionally similar phrases of words is semantically equivalent to the starting target phrase of words includes utilizing an index query engine to perform at least one world-wide-web query.

9. The method of claim 1, wherein determining whether each phrase in the list of distributionally similar phrases of words is semantically equivalent to the starting target phrase of words includes utilizing a set of templatic queries that reflect association heuristics.

10. The method of claim 1, wherein determining whether each phrase in the list of distributionally similar phrases of words is semantically equivalent to the starting target phrase of words includes utilizing a predetermined number of wildcard n-grams as a basis for inferring semantic similarity.

11. The method of claim 1, wherein determining whether each phrase in the list of distributionally similar phrases of words is semantically equivalent to the starting target phrase of words includes utilizing a coordination pattern.

12. The method of claim 1, wherein determining whether each phrase in the list of distributionally similar phrases of words is semantically equivalent to the starting target phrase of words includes utilizing a negative coordination pattern.

13. The method of claim 1, wherein determining whether each phrase in the list of distributionally similar phrases of words is semantically equivalent to the starting target phrase of words includes identifying a presence or an absence of strings signaling an explicit synonymy relationship.

14. The method of claim 1, wherein determining whether each phrase in the list of distributionally similar phrases of words is semantically equivalent to the starting target phrase of words includes determining whether there is a coordination pattern indicative of a morphological alteration.

15. The method of claim 1, wherein determining whether each phrase in the list of distributionally similar phrases of words is semantically equivalent to the starting target phrase of words includes utilizing context grouping.

16. The method of claim 15, wherein the context grouping is performed based on the plurality of left contexts for each of the n-grams.

17. The method of claim 15, wherein the context grouping is performed based on the plurality of right contexts for each of the n-grams.

18. A language processing system, comprising:
an index query engine; and
a processing component that utilizes the index query engine to perform a first left and right context search to identify an item of text that is distributionally similar to a target item of text, the first left and right context search including generating n-grams based on the target item of text and utilizing the n-grams to identify left contexts and right contexts for each of the n-grams, the item of text being identified based on it having one or more of the left and right contexts in common with the target item of text, the processing component applying multiple tests to the item of text to determine whether the item of text is semantically equivalent to the target item of text, one of the multiple tests including a second left and right context search that utilizes the item of text and the target item of text to identify additional left and right contexts for the item of text and the target item of text, the processing component making a determination that the item of text and the target item of text are semantically equivalent based on the item of text having one or more of the additional left and right contexts in common with target item of text, another one of the multiple tests including a context grouping test, the context grouping test including performing a web search to identify lists of words that are found proximate to the item of text and the target item of text in a world wide web, each word in the lists of words being associated with a web count that identifies a number of times the word is found in the web search, the context grouping test making a determination that the item of text and the target item of text are semantically equivalent based at least in part on the web counts, the item of text being added to a lattice of words for the target item of text based on the determinations from the context grouping test and from the second left and right context search that the item of text is semantically equivalent to the target item of text, and the lattice of words including at least one complete sentence and groups of words that are semantically related to portions of the at least one complete sentence.

19. The system of claim 18, wherein a third one of the multiple tests includes a negative coordination pattern test.

20. A method for supporting a language processing application, the method comprising:
obtaining a target item of text;
utilizing a context associated with the target item of text to identify another item of text that is semantically equivalent to the target item of text;
combining the target item of text and the another item of text into a slot;
generating an additional context by adding the slot to the context;
utilizing a computer processor that is a component of a computer to perform one or more index queries utilizing the additional context to identify additional items of text that are semantically equivalent to the target item of text and to the another item of text;
collapsing the target item of text, the another item of text, and the additional items of text into another slot;

utilizing the another slot to perform additional index queries to identify strings of words in a web index that correspond to the another slot;
generating a count of a number of occurrences for each of the strings of words in the web index; and
utilizing the counts of the number of occurrences to identify syntactic boundaries.

* * * * *